March 6, 1945.   W. A. GORDON   2,370,952
METHODS OF AND MEANS FOR TREATING RUBBER
Filed Aug. 7, 1941   4 Sheets-Sheet 1
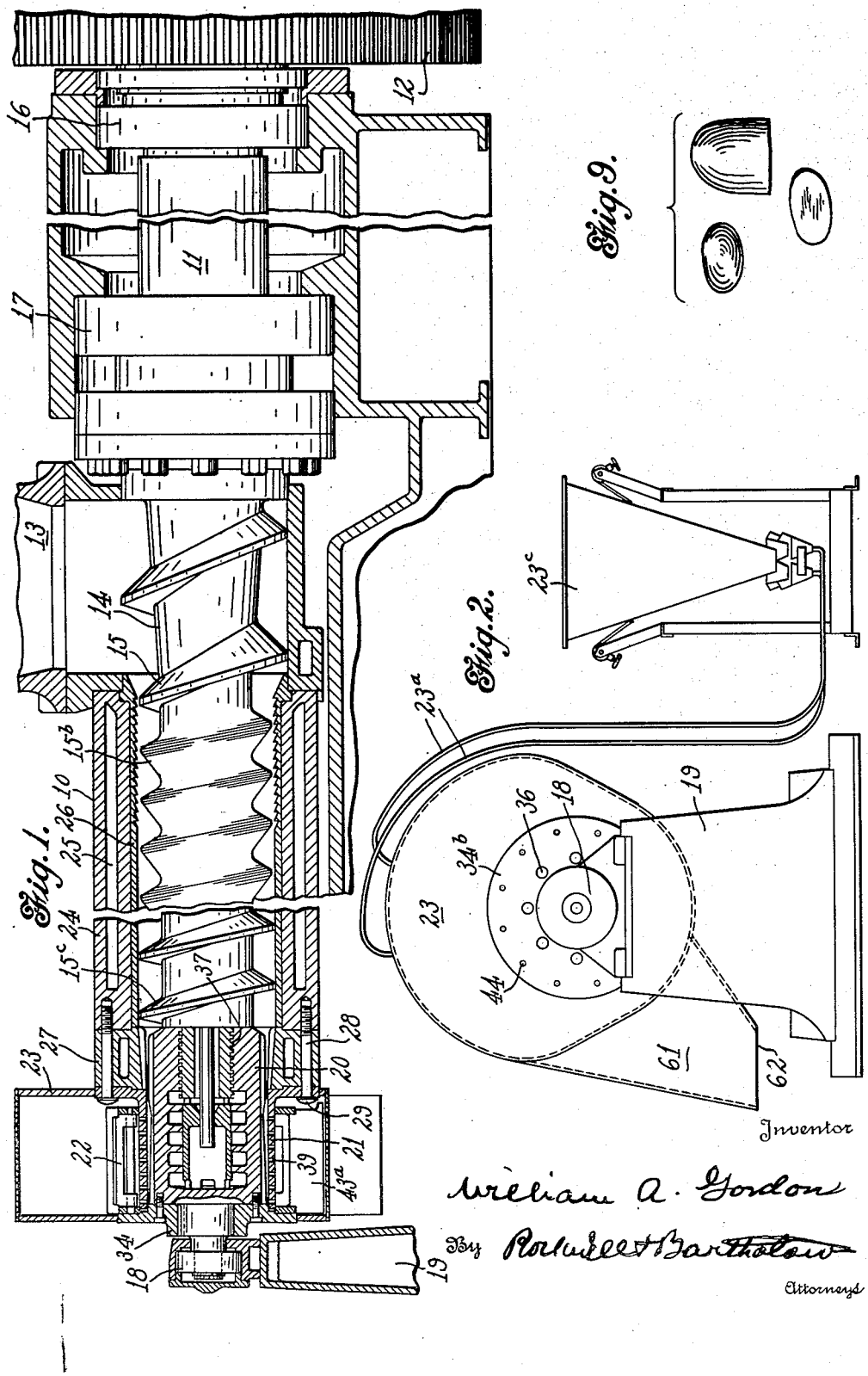

March 6, 1945. W. A. GORDON 2,370,952
METHODS OF AND MEANS FOR TREATING RUBBER
Filed Aug. 7, 1941 4 Sheets-Sheet 2

Inventor
William A. Gordon
By Rockwell & Bartholow
Attorneys

March 6, 1945. W. A. GORDON 2,370,952
METHODS OF AND MEANS FOR TREATING RUBBER
Filed Aug. 7, 1941 4 Sheets-Sheet 4

Inventor
William A. Gordon
By Rockwell Bartholow
Attorneys

Patented Mar. 6, 1945

2,370,952

UNITED STATES PATENT OFFICE 2,370,952

METHOD OF AND MEANS FOR TREATING RUBBER

William A. Gordon, Shelton, Conn., assignor to Farrel-Birmingham Company, Inc., Ansonia, Conn., a corporation of Connecticut Application August 7, 1941, Serial No. 405,749

18 Claims. (Cl. 18—12)

This invention relates to methods of and means for treating rubber, and it has special reference to the treatment of crude rubber for the purpose of providing broken-down crude rubber in the form of small pellets in condition for further treatment in the manufacture of rubber articles without the need of further breaking down of the crude rubber structure. However, in some aspects of the invention other kinds of rubber and similar material can be treated for reduction to the pellet form.

In my copending application Serial No. 244,609, filed December 8, 1938, now Patent No. 2,286,405, I have described a machine or apparatus which may be termed for convenience a "plasticator-pelletizer," in which machine a mass of crude rubber is subjected to mastication to a degree sufficient to break it down and thoroughly plasticize the same, the rubber being discharged from the machine in the form of small irregularly shaped pellets which, notwithstanding their fully plasticized and tacky interiors, have on all sides external surfaces which inhibit adhesion, so that the pellets maintain their individuality when in contact with each other in a mass.

One of the objects of the present invention is to provide an improved machine of this type.

More particularly it is aimed to increase the effectiveness and capacity of the machine and make the product more uniform.

Another object is to increase the plasticizing effect on the rubber before the rubber passes to the small openings or perforations in the shell.

Another object is to feed the rubber more effectively and uniformly to the exit openings of the shell.

To and through these and other ends the invention consists in the novel features and combinations of parts to be hereinafter described and claimed.

In the accompanying drawings:

Fig. 1 is a longitudinal, vertical section, partly broken away, of a machine embodying my invention;

Fig. 2 is an end view of the machine, looking toward the discharge end;

Figure 3:
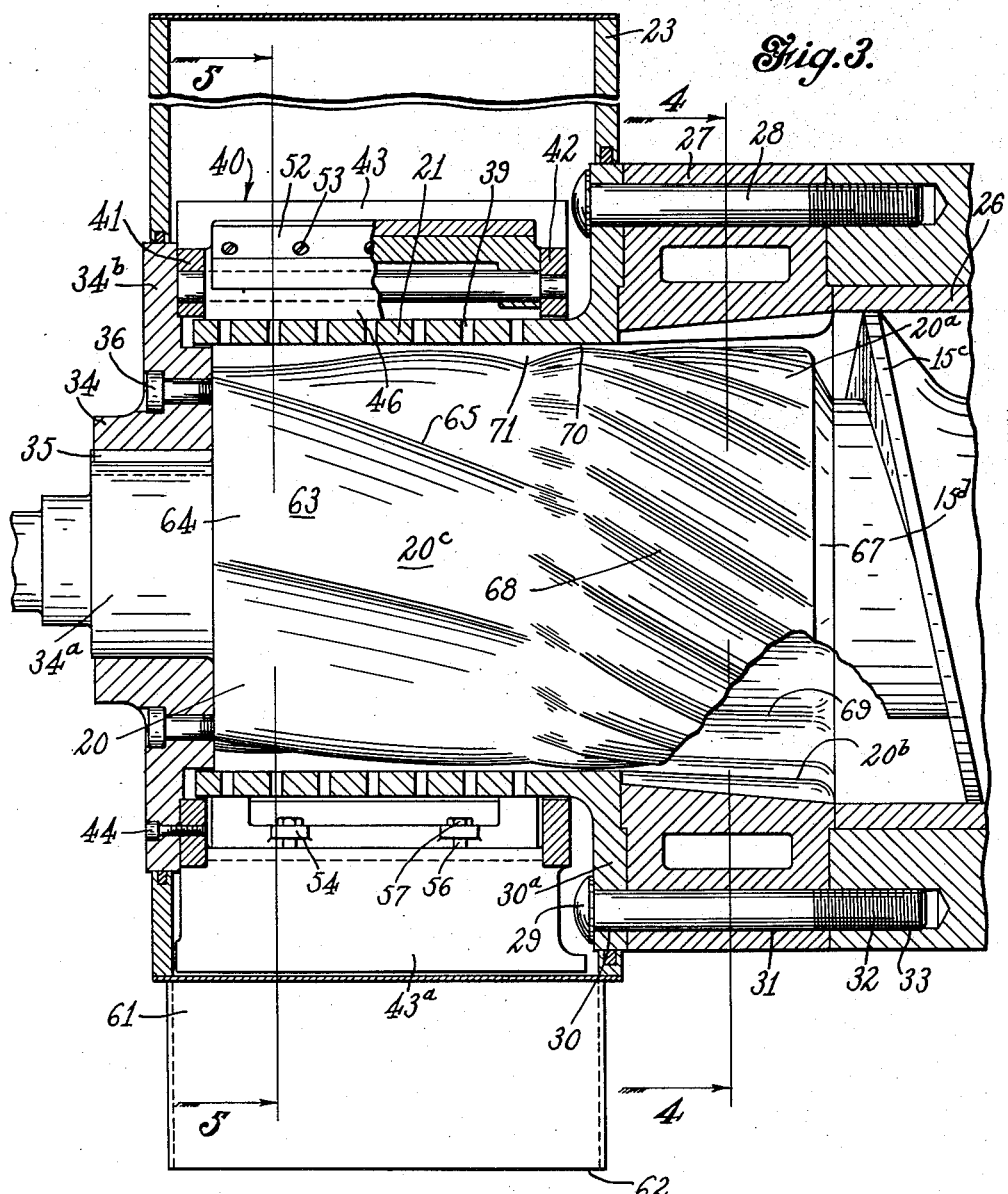
Fig. 3 is a sectional view on a larger scale of certain parts at the left of Fig. 1, with parts broken away.
Figure 8:
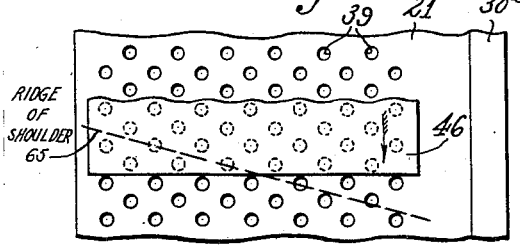
Figure 4:
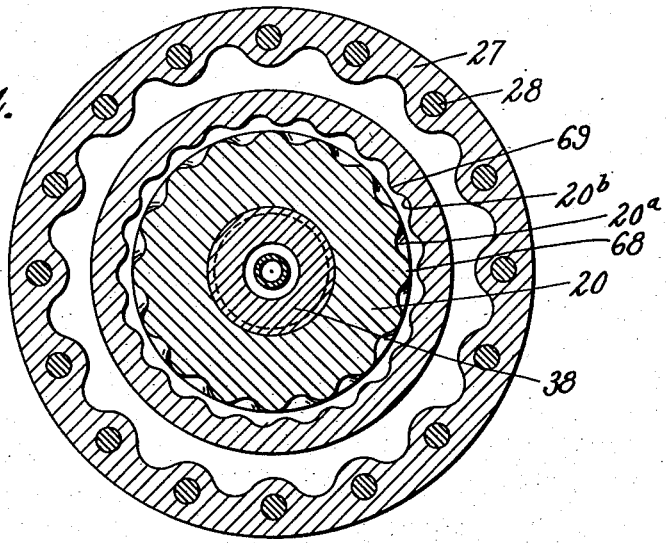
Figure 5:
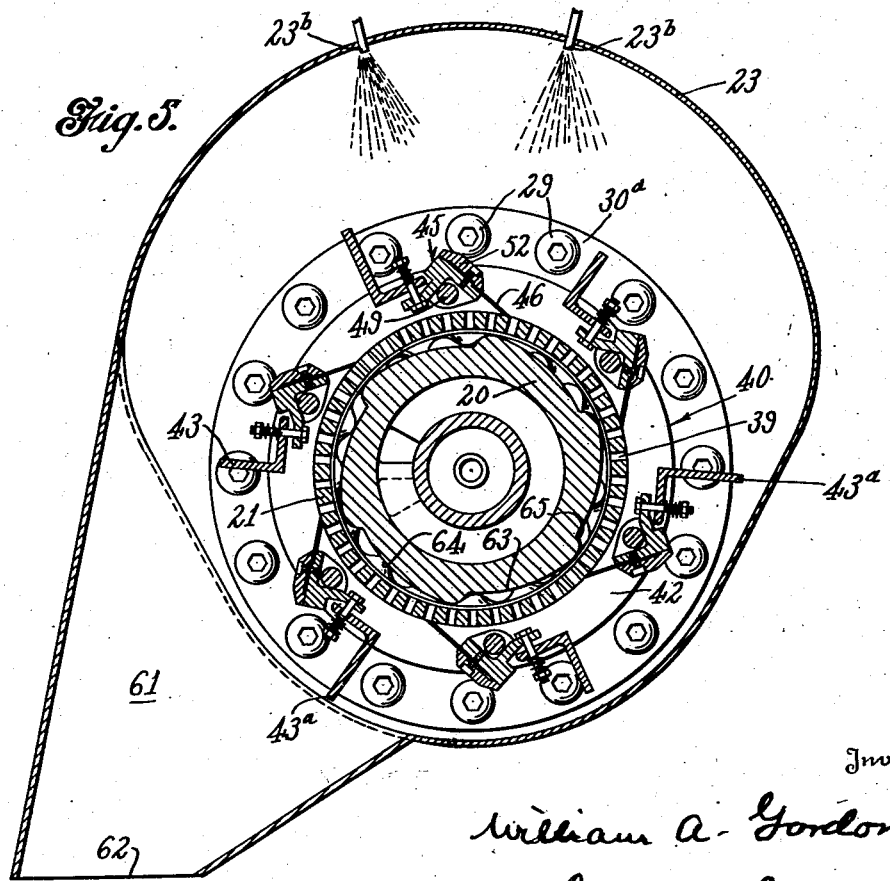
Figure 6:
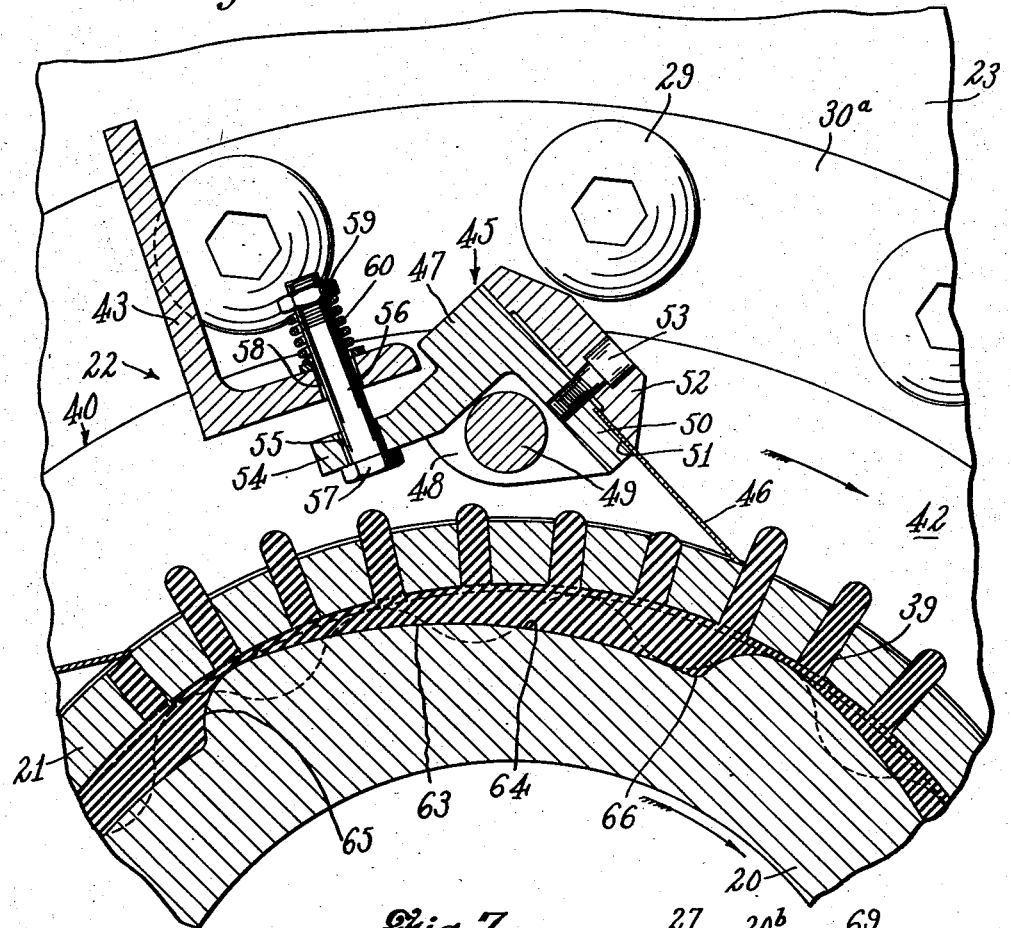
Figure 7:
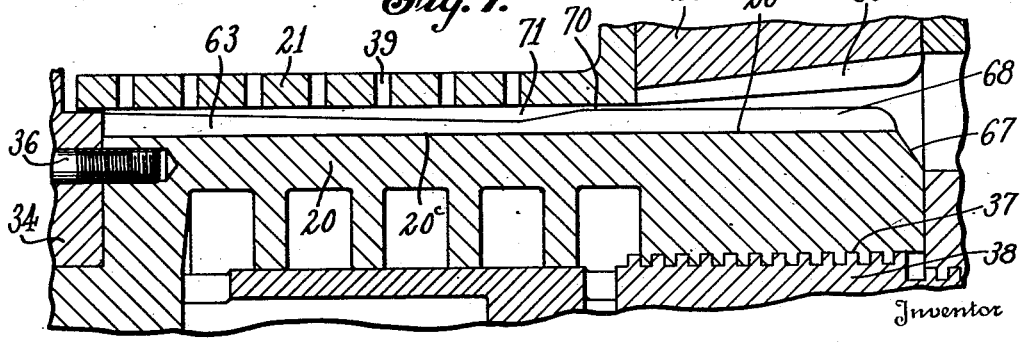

Figs. 4 and 5 are sections on lines 4—4 and 5—5 respectively of Fig. 3;

Fig. 6 is an enlarged partial transverse section showing the action of the machine as the knives cut the rubber emerging from the shell;

Fig. 7 is a view on a larger scale of certain parts shown at the left of Fig. 1;

Fig. 8 is a somewhat diagrammatic plan view showing the relation of one of the knives to the shell perforations and the adjacent discharge flute on the rotor; and Fig. 9 comprises top, side and bottom views of one of the pellets.

In its general features the machine selected for illustration comprises a casing provided with a feed hopper into which the bales of crude rubber are introduced, said casing being provided with a long shaft driven at one end from suitable gearing and having through a considerable portion of its length a rotor provided with a feeding and working blade or blades, which picks up the rubber fed into the hopper and while plasticizing is going on forces it through the casing longitudinally. The rubber is discharged in the form of thoroughly broken-down and plasticized pellets all the external surfaces of which have been treated effectively to remove their tackiness. Adjacent the discharge end of the machine a suitable shell is provided, having small perforations through which the rubber is forced, and in association with this shell there is a revolving knife mechanism which, as the rubber issues from the perforations, cuts it into small pieces. These small pieces during and after their formation, and while they are dropping from the shell, are treated in a confined space, within a supplemental casing, by subjecting them on all sides to the action of tackiness-destroying material sprayed into the supplemental casing, so that upon discharge from the supplemental casing the pellets inhibit adhesion and maintain their individuality, without sticking or locking together, and are ready for further handling as may be required before such operations as compounding are undertaken.

In the drawings, the casing of the machine is indicated generally at 10, the long shaft at 11, the large gear at one end at 12, the hopper or receiving chamber, which is intermediate of the ends of the shaft, at 13, the rotor at 14, and the feeding and working blade generally at 15. In the casing, shaft 11 has suitable bearings such as shown at 16 and 17, and at the discharge end of the machine is an outboard bearing 18 for the reduced extremity of the shaft, which bearing is at the upper end of a suitable pedestal 19. Between the outboard bearing 18 and the discharging end of the blade structure provided on the rotor for feeding and plasticizing purposes, the rotor is provided with a fluted member 20 of approximately cylindrical shape, surrounded by a perforated shell 21, around which revolves a knife structure or frame 22, this latter with the shell 21 being disposed within a supplemental casing 23.

Referring now to the details, it will be observed that the main casing 10 is provided with a cylindrical portion 24 which constitutes the main working chamber in which mastication and breaking down of the rubber takes place. This chamber is water-jacketed, as shown at 25, and is provided with a suitable lining member 26. Within this main working chamber the feeding and working screw on the rotor, which is indicated generally at 15, is provided with a plasticizing portion 15ᵇ which plasticizes the rubber by a working and smearing action against the chamber wall, and a portion 15ᶜ which has more of a longitudinal forcing or feeding action. The portion 15ᶜ of the rotor extends up to the end of the working chamber 24, or approximately so. The fluted member 20, previously mentioned, forms a continuation of the rotor beyond the termination of the portion 15ᶜ. Between the end of the chamber portion 24 and the casing 23 there is provided a ring-like part 27 of the casing, having an inner fluted surface which cooperates with the member 20 in the manner to be hereinafter described.

In the form shown, the ring-like member 27 is abutted against the end of the casing portion 24 and is removably held in place by means such as bolts 28. These bolts have manipulating heads 29, and they are passed through openings 30 in a lateral flange 30ᵃ preferably formed integrally with the body of the shell 21. The heads 29 rest against the flange 30ᵃ, and the shanks of the bolts 28 pass through openings 31 in member 27, and have threaded end portions 32 engaging threaded sockets 33 in the end of casing portion 24.

On the rotor shaft between outboard bearing 18 and the fluted member 20 is a member 34 in the nature of a hub, said member fitting over a portion 34ᵃ of a shaft part and being keyed to said part in a suitable manner, as by a key 35. Preferably the hub is fastened to the end portion of fluted member 20 in a suitable manner, as by means of bolts 36 passing through openings in the hub and into threaded sockets in the end portion of member 20. Preferably the member 20 is provided interiorly with passages for the circulation of a suitable cooling liquid, these passages being indicated in Figs. 1 and 7. At its inner end the fluted member 20 may be connected to the shaft structure of the rotor in any suitable manner. In the case illustrated, the inner end portion of the fluted member has threaded engagement at 37 with a coupling member 38 coupling it to the rotor shaft structure.

The fluted member 20 has a portion 20ᵃ within and cooperating with a fluted inner surface 20ᵇ of the ring member 27. The member 20 also has a fluted portion 20ᶜ located within and cooperating with the cylindrical wall of the shell 21, which wall is provided with a plurality of perforations 39 through which the rubber is forced.

Outside of the cylindrical wall of shell 21 the knife mechanism 22 is arranged, and the construction of this mechanism is preferably as follows:

Located around shell 21 is a frame or cage 40, preferably made as an integral welded structure and having a ring member 41 at the outer end, a ring member 42 at the inner end, and longitudinal connecting bars 43 which are preferably of L-shaped cross section, as shown in Figs. 5 and 6. The ring member 41 is adjacent the hub member 34 at the inner face of the latter, and the ring member 42 surrounds the shell body near its other end and is adapted to rotate on and about the other end portion. The frame 40 as an entirety is rotated about the shell body from the hub 34, which hub is suitably connected to the ring member 41, as by means of small bolts 44. The ring member 41 is abutted against the inner face of a flange 34ᵇ formed on the hub 34 and bolted thereto at appropriate points. The connecting L-shaped members 43 of the knife frame or cage have inner flange portions integral with the ring members 41 and 42, and from these flange portions other flange portions extend radially and outwardly.

In the present instance there are six of these connecting bars 43, and each of them serves as a support for a rockably mounted knife 45, having a blade 46 bearing against the perforated shell and adapted to cut off the rubber strings emerging therefrom. Preferably each knife 45 comprises a holder 47 provided at the ends with lugs 48 bearing on a rod 49. Each rod 49 is connected at one end to the ring member 41 and at the other end to the ring member 42, and for this purpose the extremities of the rods 49 may be fitted in perforations in the ring members.

Each knife holder 47 has a holder portion 50 with a recess 51 in its outer face in which the knife blade 46 is clamped by means of a cap plate 52 and clamping screws 53. The knife blade 46 is preferably thin and resilient and bears in a yielding manner against the exterior of the perforated shell, with the blade offset say from 30° to 45° from a line tangent to the shell.

Each knife holder 47 is also provided at different points in its length, say two points, with angularly extending arms 54, and each of these is preferably arranged inwardly of and in close proximity to the base flange of the corresponding connecting bar, there being a spring connection between the arm and the base flange. In the form shown each arm 54 is provided with a perforation 55, and through this perforation extends a bolt 56 having a head 57 at the inner side of the arm. The bolt 56 passes through a perforation 58 in the base flange of the connecting bar. A nut 59 has threaded engagement with the outer end portion of the bolt 56, and between this bolt 59 and the outer face of the base flange a helical spring 60 is interposed. This spring 60 is under compression, and it will be noted that its action is to hold the tip of the knife blade 46 yieldingly in contact with the perforated shell.

The supplementary casing 23 previously referred to, which encloses the knife mechanism, preferably has the shape in end elevation shown in Fig. 2, that is, it is roughly of oval shape, having at its upper portion a wide part which merges into a narrower lower part. The upper part is preferably curved on a long radius, and the lower part at its bottom on a short radius, the two parts being interconnected by slanting walls. The lower part of the casing conforms in curvature, or approximately conforms, to the rotary knife carrying frame above described, and it will now be noted that alternate connecting bars 43 of the knife frame have their radial flanges somewhat extended, as indicated at 43ª, to act as sweeps moving over the lower inner portion of the casing. These sweeps act to carry the pellets in the casing to a suitable discharge, for example, a discharge chute 61 provided on the casing at one side thereof, as shown in Fig. 5. The pellets passing out of the chute 61, from the lower end 62 thereof, may be collected in any suitable manner, as by a conveyor belt (not shown) passing under the lower end of the discharge spout.

For supplying to the casing 23 a tackiness-destroying medium in the form of small particles, for example, particles of talcum or other powder, I provide pipes or tubes for carrying to the casing air mixed with solid particles. In the form shown there are two tubes 23ª delivering into the upper part of the casing at the points 23ᵇ. These tubes are connected to an apparatus generally indicated at 23ᶜ, in which the powder is mixed with compressed air. The tubes 23ª, delivering into the upper part of the casing, provide sprays of tackiness-destroying powder in a generally downward direction, creating a thick, dusty atmosphere about the pieces of rubber being cut off by the knives and passing to the discharge, whereby all surfaces of the pellets, may be thoroughly treated to inhibit adhesion. However, the illustrated arrangement of the tubes carrying the powder, or other tackiness-destroying medium, to the casing, is only by way of example, and it will be noted that various other arrangents may be adopted, as conditions may require.

There is a definite advantage in providing a casing which extends upwardly and laterally substantially beyond the cutting means and which has an upper arcuate wall of substantially longer radius than the lower part of the casing, because the volume of the upper part of the casing is thus made relatively large, which facilitates the action of the soapstone or other tackiness-destroying medium upon the rubber. When this powdered material is blown into the casing, the air which carries it along is still under some compression, so that it expands freely when introduced into the casing. By having the upper part of the casing of large volume, this expansion is permitted, thereby providing an even mixture of powder and air, the powder being better diffused in the pellet treating atmosphere than would otherwise be the case.

It has been previously stated that in the form shown there are six cut-off knives, and it will now be noted that in the preferred form the fluted member 20 is provided, in that portion cooperating with the perforated shell, with a corresponding number of angularly arranged flutes, or ribs, which in rotating force the rubber out of the shell perforations. The angularity, or pitch, of these flutes is for the purpose of feeding the rubber lengthwise of the machine, but this angularity, or pitch, is relatively slight because in this portion of the machine the principal action is to force or impel the material radially so as to discharge it through the perforations of the shell. The flutes are indicated at 63, and it will be noted that each of them is relatively wide, having on its leading side a wide gradually sloping or curved surface 64 (Fig. 6) having a wedging effect on the rubber, and on its following side a short curved abrupt portion or shoulder 65. It will also be seen from Fig. 6 that the leading side 64 of one flute is immediately joined at its leading, lowest portion (indicated at 66) to the shoulder of the flute next in advance.

As will be seen from Fig. 3, that portion of the fluted member 20 which is adjacent the rotor blade portion 15ᶜ is preferably of somewhat greater diameter than the body portion 15ᵈ of the rotor at this point, but on the other hand is of somewhat less diameter than the mixing chamber defined by the lining 26. Where the member 20 is joined to the rotor shaft, or body structure, a shoulder 67 is created. This portion of the fluted member lies within the ring member 27 and is provided with angularly arranged kneading flutes co-acting with axial flutes 69 formed on the inner surface of the member 27. It will be noted, however, that whereas in this region the exterior surface of the fluted member is generally cylindrical, the inner surface of member 27 is slightly tapering, or partly conical, so that as the material advances toward the discharge, the flutes 69 bring it closer in toward the rotor element. At the discharge end of member 27 its flutes are quite close to the flutes of the rotor element. From this point onward there is a merging of the kneading flutes 68 into the flutes 63 previously described, there being a rather close fluted constriction between the inner and outer parts in the region 70, as shown in Fig. 7, but there being a relief region, or zone, as indicated at 71, around the fluted member about in line with the first row of perforations in the shell. From this region onward the flutes 63 are tapered gradually in a longitudinal direction so as to increase in radial dimension, as shown in Fig. 7, so that the pressure on the rubber will be fully maintained by an axial wedging action and the holes of the last series of perforations as well as the others fully filled with rubber.

As shown in Fig. 8, the shell perforations 39 are closely grouped and arranged in staggered rows extending in an axial direction. The knife edge is parallel to these rows and cuts off at the same time all the strings of rubber emerging from the perforations of a row.

In the treatment of rubber in accordance with the invention, the procedure is substantially as follows:

Crude rubber in the form of bales or chunks is introduced into chamber 13 and fed into and worked in the working chamber of the working cylinder 24, in which chamber it is thoroughly masticated and rendered plastic by the action of the rotor blades working it against the chamber wall. In this manner the rubber is broken down and plasticized, its initial molecular structure being substantially changed in the process. As the rubber is forced over the inner end portion of the fluted member 20 where it is subjected to the kneading or grinding action of the flutes 68 and the surrounding fluted surface of ring member 27, the rubber is further worked, warmed and rendered more plastic. The angle at which the flutes 68 are located assists in feeding the rubber in an axial direction. The rubber is forced over the fluted member 20 so as to fill the space between it and the perforated portion of the shell. The angularity of the flutes 63 causes a certain amount of lengthwise movement, but this is less than in the case of the flutes 68, and is only what is required to distribute the rubber over the perforated part of the shell and carry sufficient rubber to those perforations which are at the left of the shell (Fig. 3). The form and arrangement of the flutes 63 is such as to fill the space between the inner surface of the shell and the outer surface of the rotor portion, and is also such that the perforations in the shell will be filled quite uniformly with outwardly moving rubber, there being an effective radial component of the force exerted by the rotor portion. In this manner undue circumferential thrust against the far sides of the perforations is prevented, and round, well-filled outwardly moving strings of rubber are created.

As the fluted portion of the rotor member is rotated within the shell, the knives are moving around the shell on the outside at the same speed, and preferably the action in cutting off the rubber strings will be about as indicated in Fig. 6 where, as the strings of rubber in a given longitudinal row build up to a length about as shown, the knife reaches them, pressing resiliently against the outer surface of the shell with the blade tip arranged at a slight angle to the shell, and cuts them off, forming small pellets or bullet-like pieces, such as shown in Fig. 9. The relation of one of the knives to the shoulder 65 of the nearest flute 63 is shown in Fig. 8. The pellets are of somewhat irregular shape and those produced from the same machine will vary from each other slightly, but generally speaking they are of the form shown in Fig. 9. They usually have a somewhat flattened or elliptical, rather than a round contour, as shown, this being due to the lateral pressure exerted by the knives in cutting them off. Also these pellets have generally flat bottoms, as shown, this being due to their being cut off on an approximately straight line by the knives. The bodies of the pellets are generally of dome shape, this dome contour being due, I believe, to the mushrooming of the rubber out of the perforation after it has been cut off flush with the surface of the shell. This mushrooming effect is indicated in Fig. 6. There is, of course, greater resistance and friction adjacent the outside of the string than at the inside or core thereof.

As the pellets are cut off, they are subjected to the action of the surrounding atmosphere containing tackiness-destroying particles, and this atmosphere exists throughout the confined space in which the rubber strings emerge from the shell and are cut off and dropped to the bottom of the supplemental casing and are moved over the lower part of the casing to the discharge point. Thus all external surfaces of the pellets are effectively treated for rendering them non-adhesive. When the pellets are collected in a mass they will not adhere to each other because their surfaces are non-tacky, and they will not lock together when they are in close association with each other in a bin, or the like, because of the fact that they are devoid or substantially devoid of re-entrant angles, or the like, by which they might interlock with each other under such conditions.

The pellet form of rubber is a very convenient one for handling on a conveyor or otherwise in moving the rubber through the rubber factory, and as the pelletized rubber can be conveniently brought to the desired weight, accurate measurements, in compounding or other operations, are more easily secured. When the rubber reaches the compounding stage no further breaking down or plasticizing is necessary, owing to the fact that the pelletized rubber is already fully broken down and plasticized. Thus the compounding operation is expedited and less power is required in the compounding mixing. A light skin of talcum powder, or other adhesion inhibitor, has no prejudicial effect in the compounding operation.

In my improved machine there is a large capacity for the production of fully plasticized pellets, as there is effective plasticizing action in the cylindrical working chamber in which the blade portions 15b and 15c operate, and there is an important additional plasticizing effect provided by the inner end portion of the member 20 carrying angular flutes and cooperating with flutes on the casing wall. After passing beyond these flutes the rubber is impelled in a substantially radial direction to the shell perforations by the impelling ribs or flutes, which have their relatively flat impelling surfaces only slightly offset or divergent from the inner surface of the shell (Fig. 6).

I have also provided a very effective and satisfactory form of pelletizing head applicable to existing machines provided with plasticizing rotors. In some aspects of the invention, however, it is not essential that the rubber be plasticized before passing outwardly through the perforated shell for further treatment.

While I have shown a preferred form of the machine and have described a preferred example of my method of treating rubber, it is to be understood that many different modifications and changes may be made without departing from the principles of the invention or the scope of the claims.

What I claim is:

1. A rubber treating machine comprising a main casing and a rotor operating therein, said rotor having a main working blade for plasticizing the rubber by working it against the inner surface of said casing, and said rotor being further provided with a rotating member adjacent the discharge end of said blade provided with two sets of flutes, one set being arranged in advance of the other set, said casing having internal flutes cooperating with one set of flutes for further kneading and plasticizing the rubber as received from said blade, a surrounding perforate shell through which the rubber after being so kneaded and plasticized is forced by the other set of flutes for discharging the rubber, and knives revolving around the shell for cutting the emerging rubber strings into small pieces.

2. A rubber treating machine comprising a main casing and a rotor operating therein, said rotor having a main working blade for plasticizing the rubber by working it against the inner surface of said casing and said rotor being further provided with a rotating member adjacent the discharge end of said blade provided with two sets of flutes, one set being arranged in advance of the other set, said casing having internal flutes cooperating with one set for further kneading and plasticizing the rubber as received from said blade, a surrounding perforate shell through which the rubber after being so kneaded and plasticized is forced by the other set of flutes for discharging the rubber, and knives revolving around the shell for cutting the emerging rubber strings into small pieces, said fluted member being of approximately cylindrical form.

3. A rubber treating machine comprising a main casing and a rotor operating therein, said rotor having a main working blade for plasticizing the rubber by working it against the inner surface of said casing and said rotor being further provided with a rotating member adjacent the discharge end of said blade provided with two sets of flutes, one set being arranged in advance of the other set, said casing having internal flutes cooperating with one set for further kneading and plasticizing the rubber as received from said blade, a surrounding perforate shell through which the rubber after being so kneaded and plasticized is forced peripherally by the other set of flutes for discharging the rubber, and knives revolving around the shell for cutting the emerging rubber strings into small pieces, said fluted member being of approximately cylindrical form, and the flutes carried by said casing being provided on a separate ring-like member interposed between said shell and the adjacent end of the casing.

4. A rubber treating apparatus comprising a chamber having a rotor by which a mass of rubber is worked against the inner surface of the chamber for plasticizing it and then pushed through a kneading space between the rotor and the chamber wall for further plasticizing the rubber, a substantially cylindrical shell adjacent the end of the chamber having a multiplicity of peripheral perforations, means on the rotor for forcing the rubber to and out of said perforations, and knives revolving around the shell for cutting the emerging rubber strings into small pieces, said forcing means comprising a substantially cylindrical rotor portion having external flutes or ribs arranged at a slight angle to the rotor axis, said flutes or ribs being shaped to force the rubber from the rotor to the receiving ends of the perforations in a radial direction.

5. A rubber treating apparatus comprising a chamber having a rotor provided with a blade by which a mass of rubber is pushed substantially horizontally toward one end of the chamber, a substantially cylindrical shell adjacent the last named end of the chamber beyond the blade having a multiplicity of perforations, means on the rotor beyond the blade comprising a plurality of shallow angularly arranged flutes or ribs for forcing the rubber out of said perforations, said flutes or ribs each having a relatively wide gradually sloping leading side producing a wedging action and a relatively narrow and abrupt following side, and knives revolving about the shell for cutting the rubber into small pieces.

6. A rubber treating apparatus such as set forth in claim 5, in which the knives are of the same number as the flutes and rotate at the same speed.

7. In a machine such as described, a rubber discharging and cutting apparatus comprising a shell having a multiplicity of perforations in its periphery, a rotor portion in the shell carrying a hub adjacent one end of the shell, a cage connected to the hub to revolve about the shell having end rings and connecting bars, means for securing one of said end rings to said hub, rockably mounted knives mounted between the end rings and yieldingly pressed against the outer surface of the shell, said knives having sectional holder portions for thin flexible blades, and at substantially right angles to the holder portions arms integral with sections of the holder portions, and spring-pressed bolts connecting said arms with said connecting bars.

8. In a pelletizing head for a rubber mixing machine, the combination of a substantially cylinderical perforated shell member, a ring member adapted to be clamped in place between said shell member and the open end of a mixer casing, and a substantially cylindrical rotor part adapted to cooperate with said ring member in kneading and plasticizing the rubber and to cooperate with the shell member in discharging the rubber radially through the perforations of said member, said rotor part having a set of flutes to cooperate with an opposing portion of the ring member and another set of flutes assisting in the discharge of the rubber through said perforations.

9. In a rubber pelletizing apparatus, a rotor part having a set of rubber discharging flutes or ribs disposed about its periphery and arranged at a slight angle to the axis, each of said flutes having a relatively wide gradually sloping leading side and a narrower more abrupt following side creating a shoulder, and a shell having perforations through which said flutes discharge the rubber in a direction transverse to the rotor axis.

10. In a pelletizing head structure for a rubber machine, a rotor part of generally cylindrical shape having adjacent one end a set of kneading flutes and adjacent the other end a set of rubber discharging flutes, the latter flutes discharging the rubber in a direction transverse to the rotor axis.

11. In a pelletizing head structure for a rubber machine, a rotor part of generally cylindrical shape having adjacent one end a set of kneading flutes and adjacent the other end a set of rubber discharging flutes, the flutes of both sets being arranged at angles to the axis, the angularity of the discharge flutes being less than that of the kneading flutes, and the discharge flutes being relatively wide and having gradually sloping leading sides exerting a wedging action to expel the rubber through side discharge openings.

12. The method of treating crude rubber or similar material, which comprises subjecting a mass of the material to the action of a blade working it against an enclosing surface, so that the material is brought to a plasticized condition, then subjecting the material to a further plasticizing operation which consists in kneading it between relatively rotatable fluted members between which it is passed in a substantially axial direction, and then forcing the fully plasticized material to and through a multiplicity of perforations in a substantially radial direction by a gradual wedging action.

13. A rubber treating apparatus comprising a working chamber, a rotor having a blade in said chamber for progressing the rubber lengthwise of the chamber and simultaneously working it against the chamber surface to plasticize it, said rotor having at a point beyond the working blade a series of kneading flutes, the chamber portion being provided interiorly with a set of flutes cooperating with said last-named flutes to knead the rubber and further plasticize it, a shell adjacent the end of the chamber having a multiplicity of peripheral perforations, relatively flat faced ribs on the rotor for impelling the rubber substantially radially to said perforations so as to create emerging strings, and means for cutting off the strings so as to form pellets.

14. A rubber treating machine comprising a casing and a rotor operating therein, said rotor having a working blade for plasticizing the rubber by working it against the inner surface of the casing, and said rotor being further furnished with a substantially cylindrical member receiving the rubber from said working blade and provided adjacent its receiving end with a series of external kneading and plasticizing flutes, said casing being provided interiorly with a series of kneading and plasticizing flutes cooperating with said first series, a shell enclosing a portion of said cylindrical member located beyond said external flutes and having a multiplicity of peripheral perforations, a series of impelling flutes on said cylindrical member for impelling the rubber to and through said perforations in a substantially radial direction, and knives revolving around the shell for cutting the emerging rubber strings into small pieces.

15. In a rubber treating machine, a rotor portion, a surrounding shell having a multiplicity of peripheral perforations, means for forcing the rubber out of said perforations, a casing into which the emerging rubber enters and in which it can be subjected to the action of a tackiness-destroying medium and having a curved lower part, rotary cutting means encircling the shell for cutting off the rubber, sweep means moving around with the cutting means for carrying the cut-off pieces along the inner surface of the casing at the curved lower part toward a discharge point, said casing extending upwardly and laterally substantially beyond the cutting means and having an upper arcuate wall of substantially longer radius than the lower part of the casing, and means extending through said upper wall for spraying the tackiness-destroying medium into the casing.

16. A rubber treating apparatus comprising a chamber having a rotor provided with a blade by which a mass of rubber is forced toward one end of the chamber, a shell at the last-named end of the chamber having a multiplicity of small peripheral perforations and means on the rotor beyond the blade interiorly of the perforations and in close proximity thereto comprising generally longitudinally arranged cam-shaped ribs having gradually rising leading sides for impelling the rubber by a wedging action in a substantially radial direction from the rotor body to and through said perforations so as to fill said perforations and create well-rounded emerging strings.

17. A rubber treating apparatus comprising a chamber having a rotor provided with a blade by which a mass of rubber is forced toward one end of the chamber, a shell at the last-named end of the chamber having a multiplicity of small peripheral perforations, and means on the rotor beyond the blade interiorly of the perforations and in close proximity thereto comprising generally longitudinally arranged ribs having gradually rising face portions at the periphery of the rotor for impelling the rubber by a wedging action in a substantially radial direction from the rotor body to said perforations so as to fill said perforations and create well-rounded emerging strings, said ribs increasing in radial dimension in the direction in which the material is moved along by the rotor.

18. The method of converting a mass of rubber in plastic condition into a multiplicity of full well-rounded strings or pencils suitable for cutting into pellets, which comprises forcing the rubber in a generally longitudinal direction into a shell having a multiplicity of small peripheral openings, and then impelling the rubber to the openings in a substantially radial direction by rotating within the shell in a circumferential direction an element having a relatively wide wedging surface only slightly divergent from the inner surface of the shell.

WILLIAM A. GORDON.